(12) United States Patent
Huang et al.

(10) Patent No.: US 11,913,084 B2
(45) Date of Patent: Feb. 27, 2024

(54) QUENCHING FIXTURE

(71) Applicant: Acer Incorporated, New Taipei (TW)

(72) Inventors: Yi-Ta Huang, New Taipei (TW);
Cheng-Nan Ling, New Taipei (TW);
Chih-Chun Liu, New Taipei (TW)

(73) Assignee: Acer Incorporated, New Taipei (TW)

( * ) Notice: Subject to any disclaimer, the term of this patent is extended or adjusted under 35 U.S.C. 154(b) by 176 days.

(21) Appl. No.: 17/476,487

(22) Filed: Sep. 16, 2021

(65) Prior Publication Data

US 2022/0259687 A1 Aug. 18, 2022

(30) Foreign Application Priority Data

Feb. 18, 2021 (TW) .................................. 110201807

(51) Int. Cl.
*C21D 1/673* (2006.01)
(52) U.S. Cl.
CPC ..................... *C21D 1/673* (2013.01)
(58) Field of Classification Search
CPC ............. C21D 1/673; C21D 1/62; C21D 9/00

USPC .................................................. 266/117, 118
See application file for complete search history.

(56) References Cited

U.S. PATENT DOCUMENTS 3,534,947 A * 10/1970 Lenz ...................... C21D 1/673
266/117
4,212,690 A * 7/1980 Frosch ...................... F27D 5/00
266/119

* cited by examiner

*Primary Examiner* — Scott R Kastler
(74) *Attorney, Agent, or Firm* — JCIPRNET (57) ABSTRACT

A quenching fixture adapted to clamp at least one workpiece is provided. The quenching fixture includes a first positioning component and a second positioning component. Both of the first positioning component and the second positioning component have a positioning surface, multiple protrusions protruding from the positioning surface and a heat dissipation channel disposed between the protrusions in a staggered manner. The positioning surface of the first positioning component faces the positioning surface of the second positioning component, and the protrusions of the first positioning component overlap the protrusions of the second positioning component. The workpiece is clamped between the protrusions of the first positioning component and the protrusions of the second positioning component.

12 Claims, 7 Drawing Sheets

QUENCHING FIXTURE

CROSS-REFERENCE TO RELATED APPLICATION

This application claims the priority benefit of Taiwan application serial no. 110201807, filed on Feb. 18, 2021. The entirety of the above-mentioned patent application is hereby incorporated by reference herein and made a part of this specification.

BACKGROUND

Technical Field

The disclosure relates to a fixture, and in particular, to a quenching fixture.

Description of Related Art

In addition to the characteristics of high material strength and excellent heat dissipation, metal cases also conform to the development trend of thin lightweight design, so they are widely applied in notebook computers, smart phones, tablet computers, or other electronic products. To comply with the development trend of thin lightweight design, a metal case has also grown thinner and lighter, which in turn affects the material strength and hardness of the metal case. In other words, there is a concern about the insufficient material strength of the thinner and lighter metal case.

Taking both the development trend of thinner and lighter design and the material strength and hardness of the metal case into account, a heat treatment technology may be adopted to improve the material strength and hardness of the metal case. Specifically, the heat treatment technology includes the following three basic procedures: a solution treatment, a quenching, and an aging treatment. The solution treatment is to heat a material to the single-phase region above the solid solution line, so that all the alloying elements form a single-phase solid solution. Then, the quenching is to rapidly cool the single-phase solid solution to obtain a saturated solid solution. Finally, the aging treatment is to keep the supersaturated solid solution at room temperature or heat it at a constant temperature, so that alloying elements or intermetallic compounds that exceed the solubility are gradually precipitated to produce a strong hardening effect to improve the strength and hardness of the material.

Quenching is a rapid cooling process, and the result of uneven cooling may easily lead to deformation of a workpiece. A common method to deal with it is to perform a high-temperature leveling operation on the workpiece. Although it helps to improve the flatness of the workpiece, the annealing effect generated after the high-temperature leveling operation may weaken the material strength and hardness of the workpiece.

SUMMARY

The disclosure provides a quenching fixture, capable of not only maintaining the material strength and hardness of a workpiece but also contributing to improving the flatness of the workpiece.

The disclosure proposes a quenching fixture adapted for clamping at least one workpiece. The quenching fixture includes a first positioning component and a second positioning component. Both of the first positioning component and the second positioning component have a positioning surface, multiple protrusions protruding from the positioning surface, and a heat dissipation channel disposed between the multiple protrusions in a staggered manner. The positioning surface of the first positioning component faces the positioning surface of the second positioning component, and the multiple protrusions of the first positioning component overlap the multiple protrusions of the second positioning component respectively. The workpiece is clamped between the multiple protrusions of the first positioning component and the multiple protrusions of the second positioning component.

Based on the above, the quenching fixture in the disclosure is adapted for clamping a workpiece and provides the workpiece with evenly distributed heat dissipation space to improve the evenness of cooling and prevent the workpiece from being deformed caused by uneven cooling. In other words, the quenching fixture in the disclosure may be applied to the heat treatment technology and contributes to improving the flatness of the workpiece. Therefore, after the heat treatment, there is no need to perform high-temperature leveling operations on the workpiece, which further contributes to maintaining the material strength and hardness of the workpiece.

In order to make the aforementioned features and advantages of the invention comprehensible, embodiments accompanied with drawings are described in detail below.

DESCRIPTION OF THE EMBODIMENTS

Figure 1:
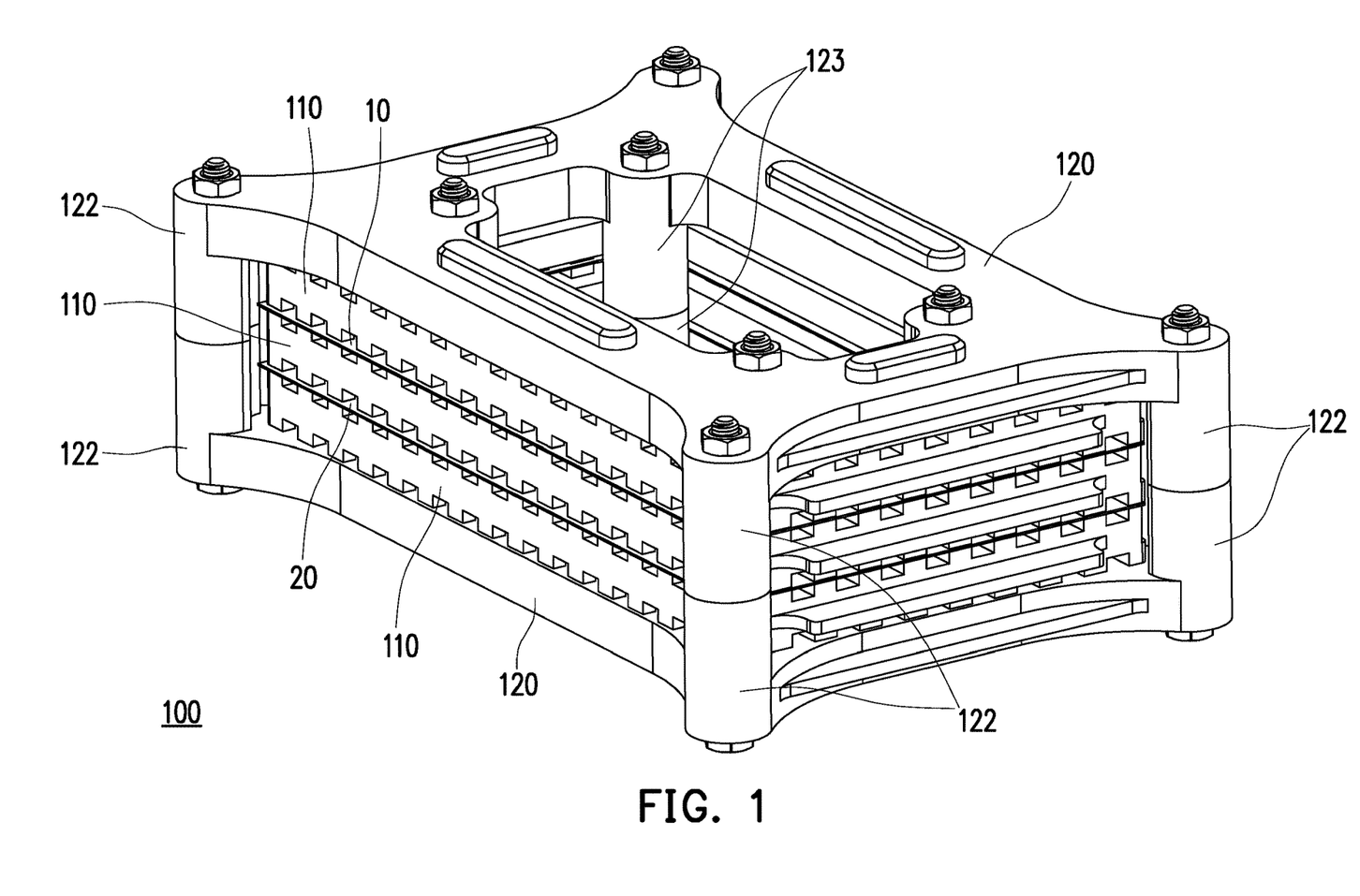
FIG. 1 is a schematic view of a quenching fixture according to an embodiment of the disclosure.
Figure 2:
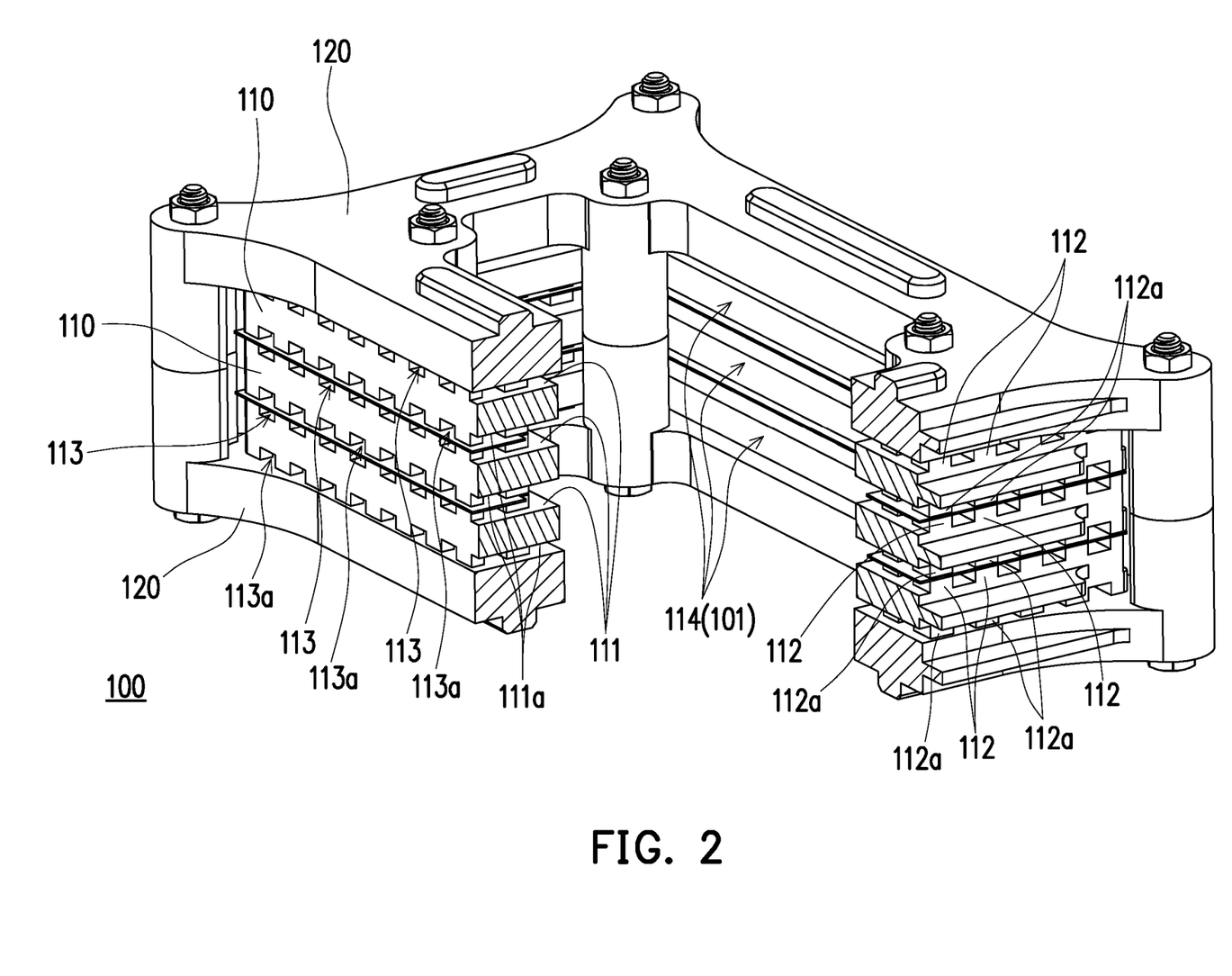
FIG. 2 is a schematic perspective cross-sectional view of the quenching fixture of FIG. 1.
Figure 3:
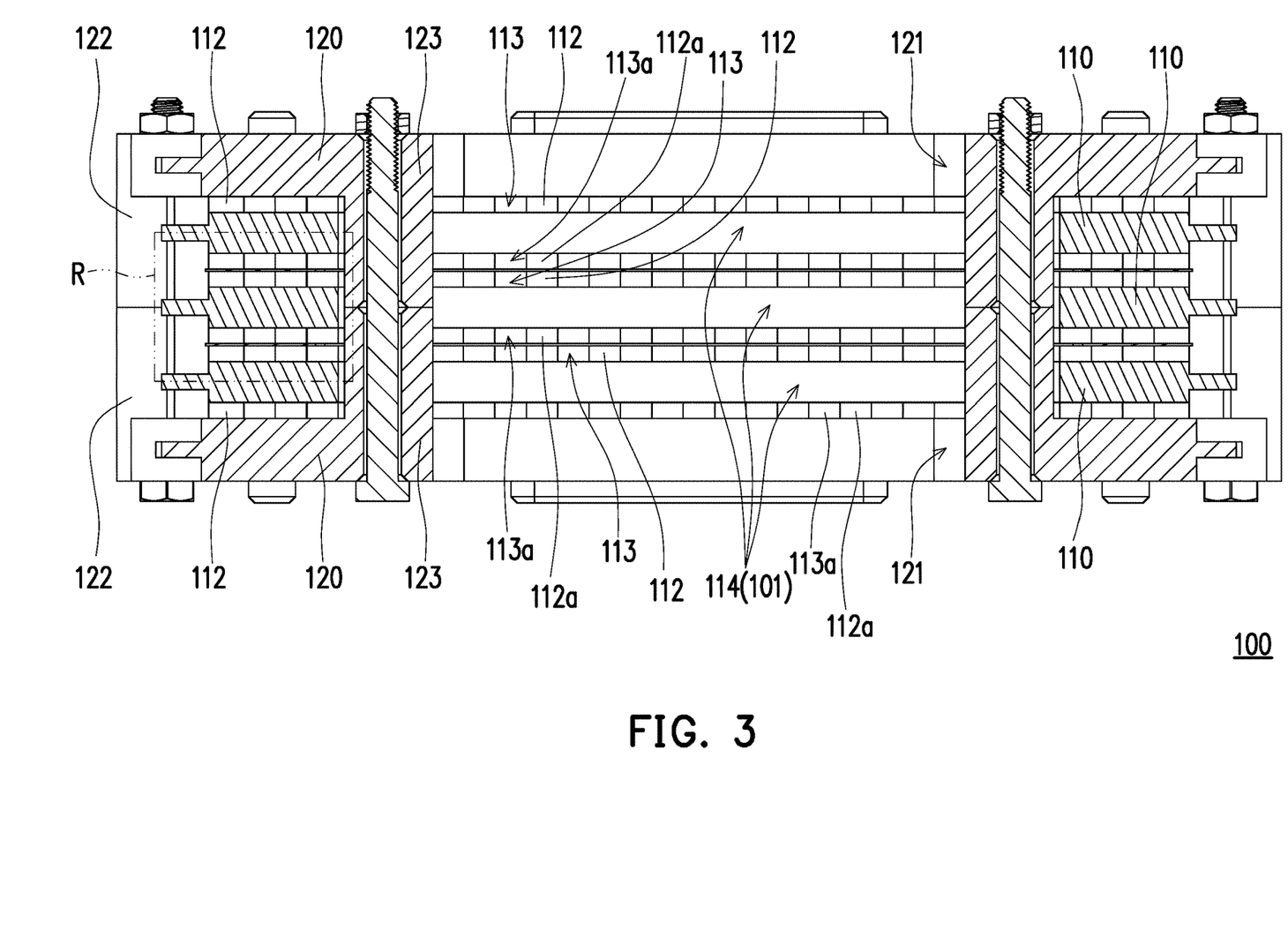
FIG. 3 is a schematic cross-sectional view of the quenching fixture of FIG. 1.

FIG. 1 is a schematic view of a quenching fixture according to an embodiment of the disclosure. FIG. 2 is a schematic perspective cross-sectional view of the quenching fixture of FIG. 1. FIG. 3 is a schematic cross-sectional view of the quenching fixture of FIG. 1. Referring to FIG. 1 to FIG. 3, in the embodiment, a quenching fixture 100 includes three positioning components 110 and two positioning bases 120. The three positioning components 110 are stacked between the two positioning bases 120. Moreover, the two positioning bases 120 clamp and fix the three positioning components 110 to prevent the three positioning components 110 from yawing or wobbling between the two positioning bases 120 and to prevent any two adjacent positioning components 110 from being offset relative to each other.

Figure 4:
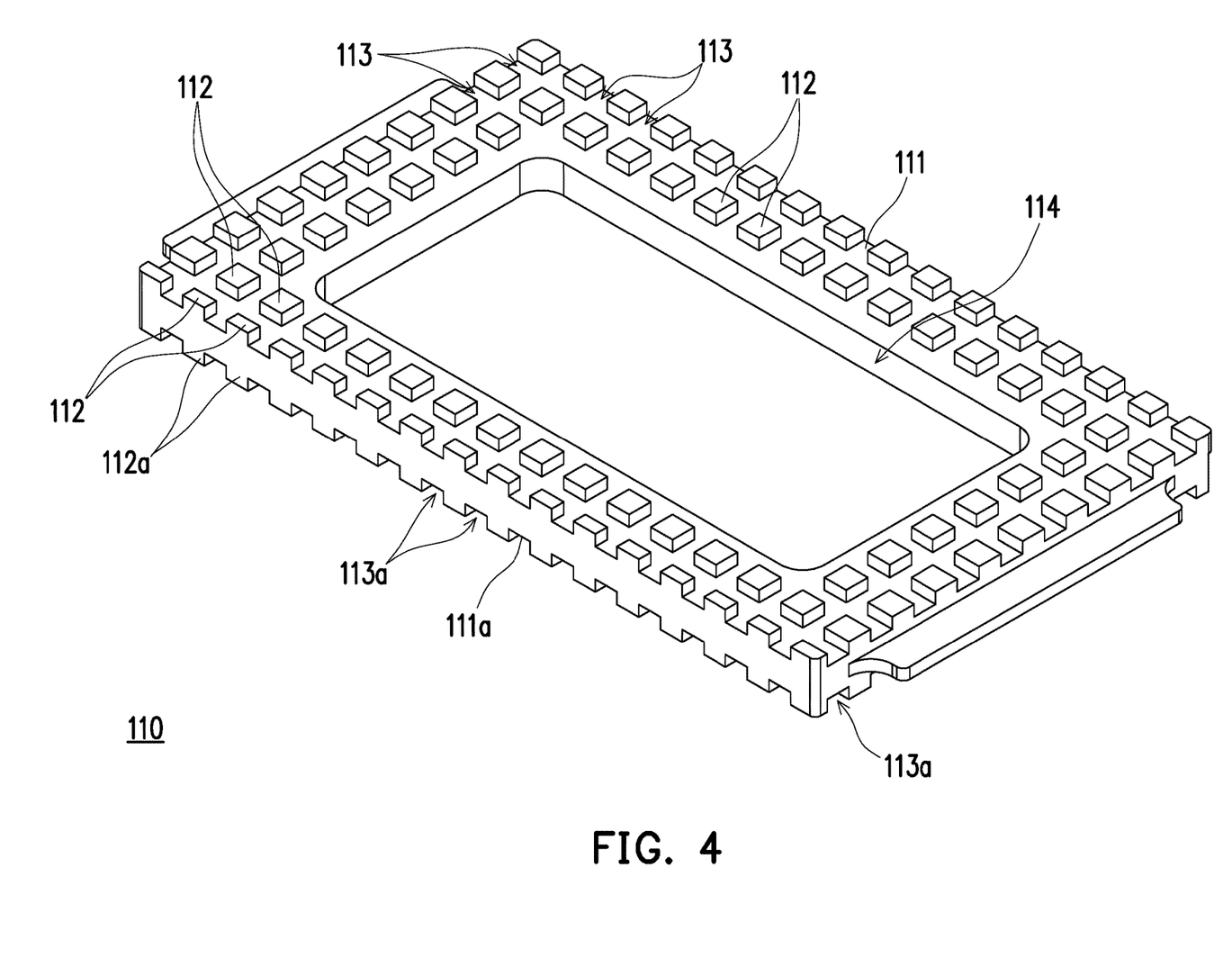
FIG. 4 and FIG. 5 are schematic views of a positioning component of FIG. 1 in two different viewing angles.
Figure 5:
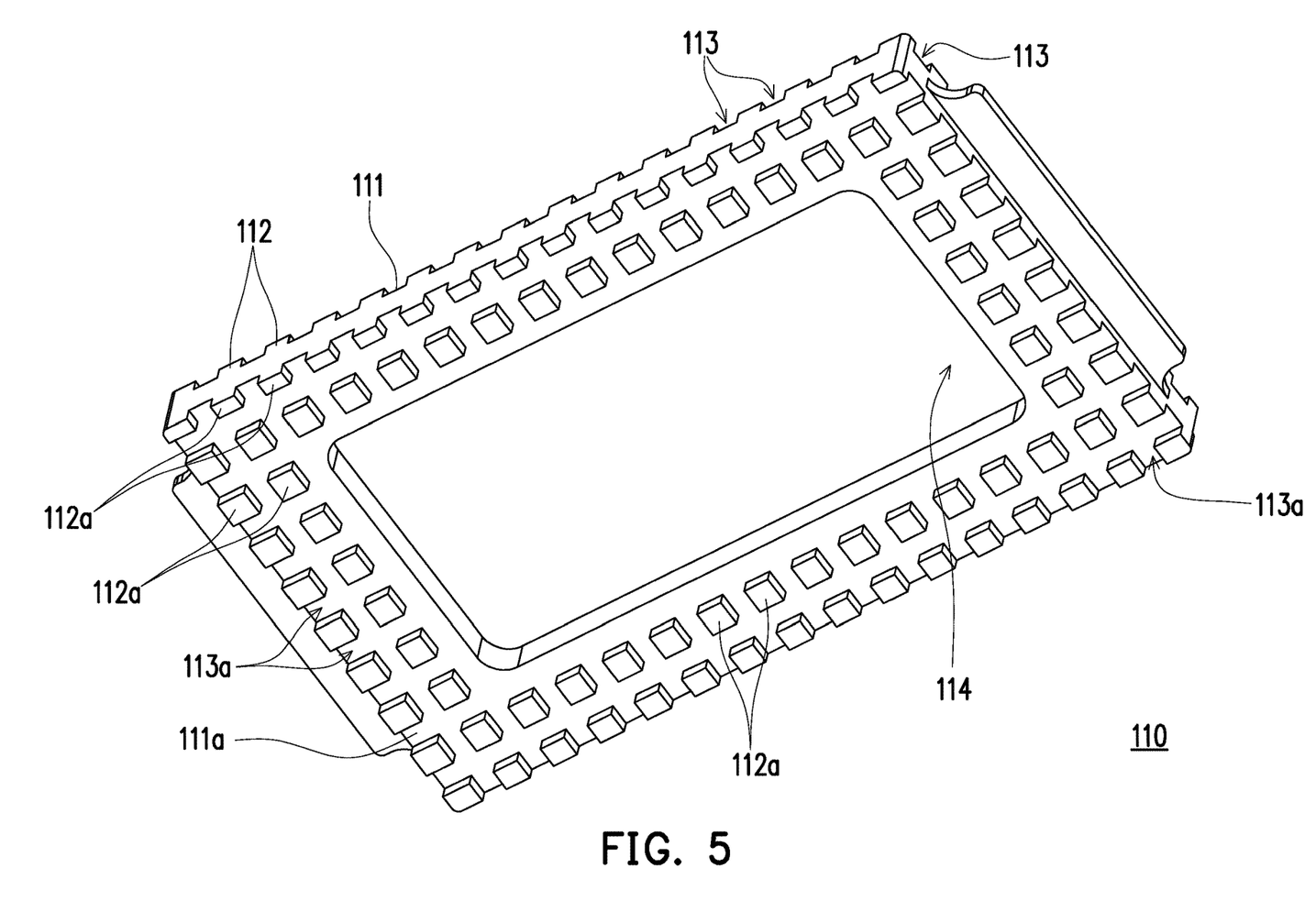

FIG. 4 and FIG. 5 are schematic views of a positioning component of FIG. 1 in two different viewing angles. Referring to FIG. 2, FIG. 4 and FIG. 5, each of the positioning components 110 has a first positioning surface 111, a second positioning surface 111a opposite to the first positioning surface 111, multiple first protrusions 112 protruding from the first positioning surface 111, and multiple second protrusions 112a protruding from the second positioning surface 111a. The quantity of the multiple first protrusions 112 is equal to the quantity of the multiple second protrusions 112a, and the arrangement of the multiple first protrusions 112 on the first positioning surface 111 is the same as that of the multiple second protrusions 112a on the second positioning surface 111a. That is, in the same positioning component 110, the orthographic projections of the multiple first protrusions 112 and the multiple second protrusions 112a overlap.

On the other hand, multiple first protrusions 112 define a staggered first heat dissipation channel 113 on the first positioning surface 111, and multiple second protrusions 112a define a staggered second heat dissipation channel 113a on the second positioning surface 111a. Since the arrangement of the multiple first protrusions 112 on the first positioning surface 111 is the same as the arrangement of the multiple second protrusions 112a on the second positioning surface 111a, the geometric outline of the first heat dissipation channel 113 is the same as the geometric outline of the second heat dissipation channel 113a, and the orthographic projections of the first heat dissipation channel 113 and the second heat dissipation channel 113a overlap.

Referring to FIG. 2 to FIG. 4, the first positioning surface 111 of the positioning component 110 in the middle faces the second positioning surface 111a of the positioning component 110 in the upper level, and the second positioning surface 111a of the positioning component 110 in the middle faces the first positioning surface 111 of the positioning component 110 in the lower level. The first positioning surface 111 of the positioning component 110 in the upper level faces the positioning base 120 in the upper level and is in contact with the positioning base 120 in the upper level through the multiple first protrusions 112. The second positioning surface 111a of the positioning component 110 in the lower level faces the positioning base 120 in the lower level and is in contact with the positioning base 120 in the lower level through the multiple second protrusions 112a.

Figure 6:
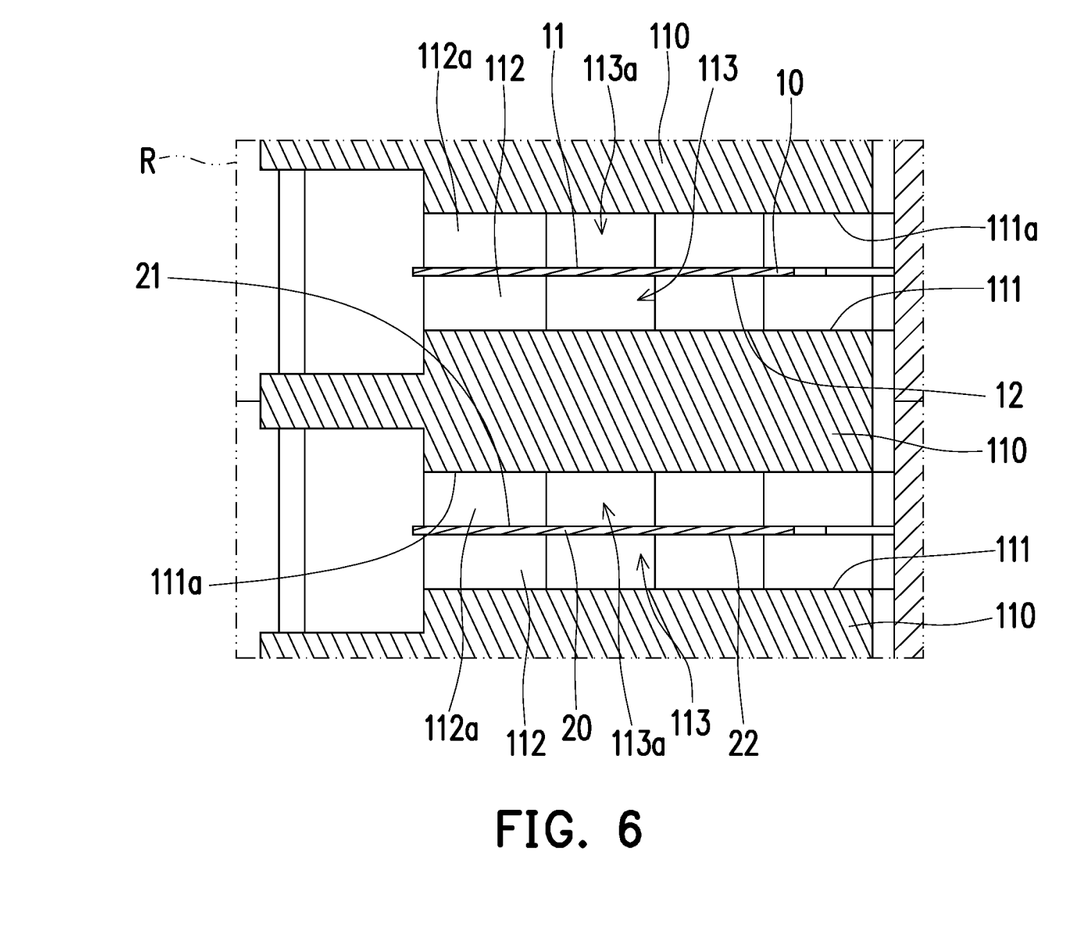
FIG. 6 is an enlarged schematic view of an area R in FIG. 3.

FIG. 6 is an enlarged schematic view of an area R in FIG. 3. Referring to FIG. 2, FIG. 3, and FIG. 6, the positioning component 110 in the middle and the positioning component 110 in the upper level clamp a workpiece 10, and the workpiece 10 has a first surface 11 and a second surface 12 opposite to the first surface 11. The first positioning surface 111 of the positioning component 110 in the middle faces the second surface 12 and is in contract with the second surface 12 through the multiple first protrusions 112. The second positioning surface 111a of the positioning component 110 in the upper level faces the first surface 11 and is in contact with the first surface 11 through the multiple second protrusions 112a. The orthographic projections of the multiple first protrusions 112 of the positioning component 110 in the middle and the multiple second protrusions 112a of the positioning component 110 in the upper level overlap to improve the stability of clamping the workpiece 10.

The positioning component 110 in the middle and the positioning component 110 in the lower level clamp a workpiece 20, and the workpiece 20 has a first surface 21 and a second surface 22 opposite to the first surface 21. The second positioning surface 111a of the positioning component 110 in the middle faces the first surface 21 and is in contact with the first surface 21 through the multiple second protrusions 112a. The first positioning surface 111 of the positioning component 110 in the lower level faces the second surface 22 and is in contact with the second surface 22 through the multiple first protrusions 112. The orthographic projections of the multiple second protrusions 112a of the positioning component 110 in the middle and the multiple first protrusions 112 of the positioning component 110 in the lower level overlap to improve the stability of clamping the workpiece 20.

Referring to FIG. 2, FIG. 3 and FIG. 6, the workpiece 10 is a metal plate. During the quenching process performed on the workpiece 10, the workpiece 10 is clamped and fixed between the multiple first protrusions 112 of the positioning component 110 in the middle and the second protrusions 112a of the positioning component 110 in the upper level. The contact positions of the multiple first protrusions 112 on the second surface 12 of the workpiece 10 are evenly distributed, and the contact positions of the multiple second protrusions 112a and the first surface 11 of the workpiece 10 are evenly distributed. In addition, the contact positions of the multiple first protrusions 112 on the second surface 12 of the workpiece 10 overlap with the orthographic projections of the contact positions of the multiple second protrusions 112a on the first surface 11 of the workpiece 10. By clamping two adjacent positioning components 110, the workpiece 10 is not easily subject to deformation caused by rapid cooling, so the flatness of the workpiece 10 is improved.

On the other hand, the first heat dissipation channel 113 on the first positioning surface 111 of the positioning component 110 in the middle faces the second surface 12 of the workpiece 10, and the second heat dissipation channel 113a on the second positioning surface 111a of the positioning component 110 in the upper level faces the first surface 11 of the workpiece 10. The staggered first heat dissipation channels 113 and the staggered second heat dissipation channels 113a respectively provide the second surface 12 and the first surface 11 of the workpiece 10 with evenly distributed heat dissipation space to improve the evenness of cooling and prevent the workpiece 10 from being deformed caused by uneven cooling.

Referring to FIG. 2, FIG. 3, and FIG. 6, the workpiece 20 is a metal plate. During the quenching process performed on the workpiece 20, the workpiece 20 is clamped and fixed between the multiple second protrusions 112a of the positioning component 110 in the middle and the multiple first protrusions 112 of the positioning component 110 in the lower level. The contact positions of the multiple second protrusions 112a on the first surface 21 of the workpiece 20 are evenly distributed, and the contact positions of the multiple first protrusions 112 on the second surface 22 of the workpiece 20 are evenly distributed. In addition, the contact positions of the multiple second protrusions 112a on the first surface 21 of the workpiece 20 overlap with the orthographic projections of the contact positions of the multiple first protrusions 112 on the second surface 22 of the workpiece 20. By clamping two adjacent positioning components 110, the workpiece 20 is not easily subject to deformation caused by rapid cooling, so the flatness of the workpiece 20 is improved.

On the other hand, the second heat dissipation channel 113a on the second positioning surface 111a of the positioning component 110 in the middle faces the first surface 21 of the workpiece 20, and the first heat dissipation channel 113 on the first positioning surface 111 of the positioning component 110 in the lower level faces the second surface 22 of the workpiece 20. The staggered second heat dissipation channels 113a and the staggered first heat dissipation channels 113 respectively provide the first surface 21 and the second surface 22 of the workpiece 20 with evenly distributed heat dissipation space to improve the evenness of cooling and prevent the workpiece 20 from being deformed caused by uneven cooling.

In other words, the quenching fixture 100 may be applied to the heat treatment technology and contributes to improving the flatness of the workpieces 10 and 20. Therefore, after the heat treatment, there is no need to perform high-temperature leveling operations on the workpieces 10 and 20, which further contributes to maintaining the material strength and hardness of the workpieces 10 and 20.

Referring to FIG. 4 and FIG. 5, in the embodiment, each of the positioning components 110 is a hollow plate and has an opening 114 penetrating the first positioning surface 111 and the second positioning surface 111a. In each of the positioning components 110, multiple first protrusions 112 and multiple second protrusions 112a are distributed around the opening 114.

Referring to FIG. 2 and FIG. 3, in three positioning components 110 in a stack, the three openings 114 overlap to form a convection space 101 and are connected to the first heat dissipation channel 113 and the second heat dissipation channel 113a of each of the positioning components 110 to improve the convection efficiency and the heat dissipation efficiency. Furthermore, hot air may flow through the first heat dissipation channel 113 and the second heat dissipation channel 113a and then may be directly discharged to the outside. In addition, the hot air may also flow into the convection space 101 through the first heat dissipation channel 113 and the second heat dissipation channel 113a and then may be discharged from the convection space 101 to the outside.

Figure 7:
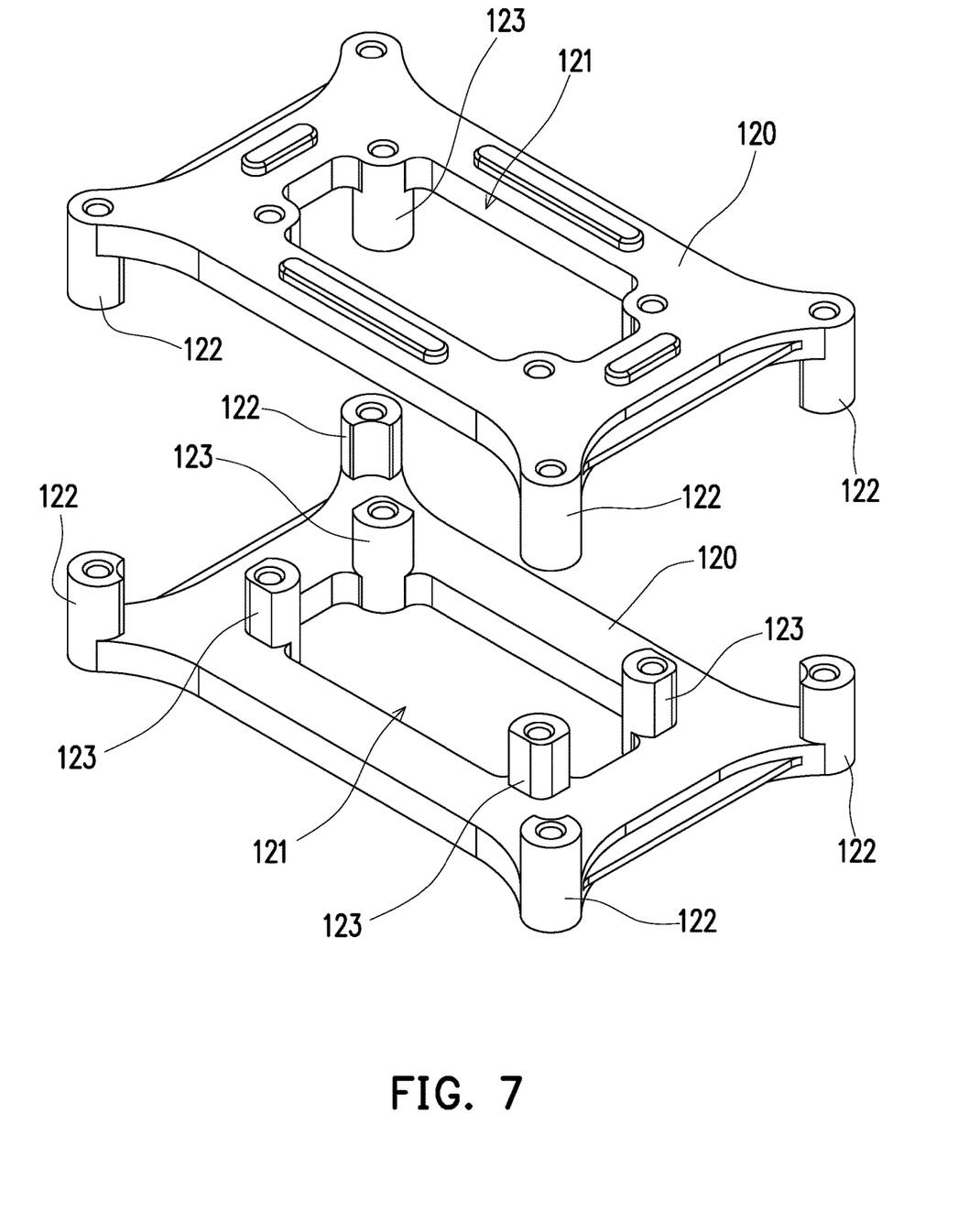
FIG. 7 is an exploded schematic view of two positioning bases of FIG. 1.

FIG. 7 is an exploded schematic view of two positioning bases of FIG. 1. Referring to FIG. 2, FIG. 3, and FIG. 7, in the embodiment, each of the positioning bases 120 is a hollow seat and has an opening 121 penetrating the upper and lower surfaces thereof. The two openings 121 of the two positioning bases 120 overlap the convection space 101 and respectively are disposed on two sides of the convection space 101. The two openings 121 of the two positioning bases 120 communicate with the convection space 101, so the hot air may be discharged from the convection space 101 to the outside through the two openings 121 of the two positioning bases 120.

As shown in FIG. 2 and FIG. 7, each of the positioning bases 120 includes multiple first positioning posts 122 and multiple second positioning posts 123. The multiple second positioning posts 123 are distributed around the opening 121, and the multiple first positioning posts 122 are distributed around the multiple second positioning posts 123. The multiple first positioning posts 122 and the multiple second positioning posts 123 define a positioning space for accommodating the positioning component 110 to prevent the positioning component 110 disposed on the positioning base 120 from being offset or sliding randomly.

As shown in FIG. 1, FIG. 3, and FIG. 7, the multiple second positioning posts 123 of each of the positioning bases 120 may be distributed at the four corners of the opening 121. The multiple second positioning posts 123 pass through the opening 114 of at least one of the positioning components 110 and may be distributed at the four corners of the opening 114. In addition, the multiple first positioning posts 122 of the positioning base 120 in the upper level are locked and fixed to the multiple first positioning posts 122 of the positioning base 120 in the lower level, and the multiple second positioning posts 123 of the positioning base 120 in the upper level are locked and fixed to the multiple second positioning posts 123 of the positioning base 120 in the lower level to securely clamp and fix the three positioning components 110 between the two positioning bases 120.

Once the two positioning bases 120 are not locked, an operator may quickly dismantle the two positioning bases 120 and remove the three positioning components 110 and the workpieces 10 and 20 quickly. Also, the operator may quickly install the three positioning components 110 and the workpieces 10 and 20 back to the positions by using the positioning structures (i.e., the first positioning post 122 and the second positioning post 123) on the two positioning bases 120, and meanwhile the three positioning components 110 and the workpieces 10 and 20 are pressed tightly after the two positioning bases 120 are locked.

In other embodiments, the quenching fixture includes two positioning components and is adapted to clamp a clamping workpiece. Alternatively, the quenching fixture includes two positioning components and two positioning bases, the two positioning components are adapted to clamp a workpiece, and the two positioning bases are adapted to clamp the two positioning components. Alternatively, the quenching fixture includes three positioning components, and any two adjacent positioning components are adapted to clamp a workpiece.

Based on the above, the quenching fixture in the disclosure is adapted for clamping a workpiece and provides the workpiece with evenly distributed heat dissipation space to improve the evenness of cooling and prevent the workpiece from being deformed caused by uneven cooling. In other words, the quenching fixture in the disclosure may be applied to the heat treatment technology and contributes to improving the flatness of the workpiece. Therefore, after the heat treatment, there is no need to perform high-temperature leveling operations on the workpiece, which further contributes to maintaining the material strength and hardness of the workpiece.

Although the disclosure has been described with reference to the above embodiments, they are not intended to limit the disclosure. It will be apparent to one of ordinary skill in the art that modifications and changes to the described embodiments may be made without departing from the spirit and the scope of the disclosure. Accordingly, the scope of the disclosure will be defined by the attached claims and their equivalents and not by the above detailed descriptions.

What is claimed is:

1. A quenching fixture adapted for clamping at least one workpiece, wherein the quenching fixture comprises:
   a first positioning component comprising a positioning surface, an opening penetrating the positioning surface, a plurality of protrusions protruding from the positioning surface, and a heat dissipation channel disposed between the plurality of protrusions in a staggered manner; and
   a second positioning component disposed on the first positioning component, wherein the second positioning component comprises a positioning surface, an opening penetrating the positioning surface, a plurality of protrusions protruding from the positioning surface, and a heat dissipation channel disposed between the plurality of protrusions in a staggered manner, wherein the positioning surface of the first positioning component faces the positioning surface of the second positioning component, the plurality of protrusions of the first positioning component overlap the plurality of protrusions of the second positioning component respectively, and the workpiece is clamped between the plurality of protrusions of the first positioning component and the plurality of protrusions of the second positioning component, wherein the opening of the first positioning component overlaps the opening of the second positioning component to form a convection space which is communicated with the heat dissipation channel on the positioning surface of the first positioning component and the heat dissipation channel on the positioning surface of the second positioning component.

2. The quenching fixture according to claim 1, wherein the heat dissipation channel of the first positioning component overlaps the heat dissipation channel of the second positioning component.

3. The quenching fixture according to claim 1, wherein the quantity of the plurality of protrusions of the first positioning component is equal to the quantity of the plurality of protrusions of the second positioning component.

4. The quenching fixture according to claim 1, further comprising:
  a first positioning base; and
  a second positioning base, wherein the first positioning component and the second positioning component are clamped and fixed between the first positioning base and the second positioning base.

5. The quenching fixture according to claim 4, wherein both of the first positioning base and the second positioning base comprise a plurality of first positioning posts, the plurality of first positioning posts of the first positioning base are locked and fixed to the plurality of first positioning posts of the second positioning base, and the plurality of first positioning posts of the first positioning base and the plurality of first positioning posts of the second positioning base are distributed around the first positioning component and the second positioning component.

6. The quenching fixture according to claim 5, wherein both of the first positioning base and the second positioning base further comprise a plurality of second positioning posts, and the plurality of second positioning posts of the first positioning base are locked and fixed to the plurality of second positioning posts of the second positioning base, wherein the plurality of first positioning posts of the first positioning base are distributed around the plurality of second positioning posts of the first positioning base, and the plurality of first positioning posts of the second positioning base are distributed around the plurality of second positioning posts of the second positioning base.

7. The quenching fixture according to claim 6, wherein the plurality of second positioning posts of the first positioning base pass through at least one of the openings of the first positioning component and the second positioning component, and the plurality of second positioning posts of the second positioning base pass through at least one of the openings of the first positioning component and the second positioning component.

8. The quenching fixture according to claim 7, wherein the plurality of protrusions of the first positioning component are distributed around the opening of the first positioning component, and the plurality of protrusions of the second positioning component are distributed around the opening of the second positioning component.

9. The quenching fixture according to claim 7, wherein both of the first positioning base and the second positioning base comprise openings; and the opening of the first positioning base, the opening of the second positioning base, the opening of the first positioning component, and the opening of the second positioning component overlap one another.

10. The quenching fixture according to claim 9, wherein the plurality of second positioning posts of the first positioning base are distributed around the opening of the first positioning base, and the plurality of second positioning posts of the second positioning base are distributed around the opening of the second positioning base.

11. The quenching fixture according to claim 1, wherein each of the first positioning component and the second positioning component is a hollow plate.

12. The quenching fixture according to claim 4, wherein each of the first positioning base and the second positioning base is a hollow seat.

* * * * *